March 23, 1943.  W. D. McINTYRE ET AL  2,314,505
SPRING SUSPENSION FOR VEHICLES
Filed March 4, 1940
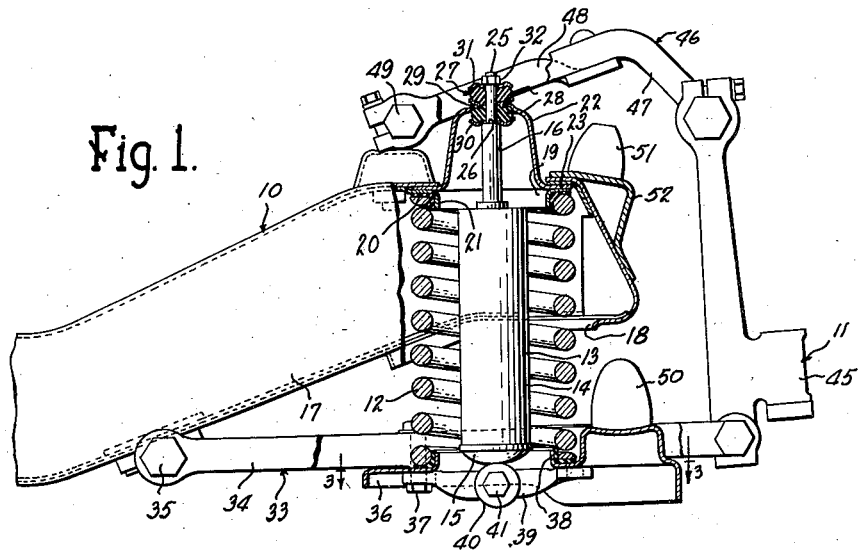
INVENTORS
WILLIAM D. McINTYRE
JOHN M. NICKELSEN
CHARLES E. READ
BY
ATTORNEYS Patented Mar. 23, 1943

2,314,505

UNITED STATES PATENT OFFICE 2,314,505

SPRING SUSPENSION FOR VEHICLES

William D. McIntyre, Monroe, John M. Nickelsen, Ann Arbor, and Charles E. Read, Monroe, Mich., assignors to Monroe Auto Equipment Company, Monroe, Mich., a corporation of Michigan Application March 4, 1940, Serial No. 322,212

5 Claims. (Cl. 267—20)

This invention relates generally to vehicle suspension systems of the type embodying coil springs for supporting the sprung assembly on the unsprung assembly and having shock absorbers of the direct acting type between the two assemblies for controlling the action of the springs.

One of the principal objects of this invention is to mount the direct acting shock absorbers within the coil springs. As a result of this feature, the following advantages are obtained: (1) the location of the shock absorbers on or near the major axes of the coil springs affords economies in design of the component parts of the suspension system because the portions of these parts in the region of the springs are originally designed with sufficient strength to withstand the stresses of spring deflection and, accordingly, need not be strengthened or reinforced to take the stresses applied to the parts by the shock absorbers, (2) the leverage between the springs and the shock absorbers is practically eliminated with the result that the stresses on the shock absorbers and the associated parts of the suspension system are reduced to the minimum, (3) the installation permits greater displacement of the shock absorbers and thereby insures more satisfactory control of spring deflection, and (4) the coil springs protect the shock absorbers against injury by stones or other objects thrown in the direction of the shock absorbers by the ground engaging wheels.

Another advantageous feature of the present invention resides in the provision of an independent wheel suspension system having a coil spring with a direct acting shock absorber extending therethrough and connected to the component parts of the vehicle in a manner to reduce the load of the shock absorber on critical parts of the suspension system to a minimum.

The foregoing, as well as other objects, will be made more apparent as this description proceeds, especially when considered in connection with the accompanying drawing, wherein:

Figure 1 is a fragmentary front elevational view of a portion of a vehicle embodying a suspension system constructed in accordance with this invention;

Figure 2 is a plan view of the construction shown in Figure 1;

Figure 3 is a sectional view taken substantially on the plane indicated by the line 3—3 of Figure 1;

Figure 4 is a fragmentary sectional view illustrating a slightly modified form of construction.

For the purpose of illustration, we have shown our invention as employed in combination with an independent wheel suspension system of the coil spring type, although it will be apparent from the following description that the invention is applicable to practically any type of suspension system having a coil spring.

In Figure 1 of the drawing, the reference character 10 designates a portion of the sprung assembly of the vehicle and the reference character 11 indicates a part of the unsprung assembly of the vehicle. The sprung assembly 10 is supported from the unsprung assembly 11 by means of a coil spring 12 having the lower end seated on the unsprung assembly and having the upper end abutting the sprung assembly. The arrangement is such that the reactions transmitted to the unsprung assembly 11 by the road engaging wheels (not shown) are cushioned by the coil spring 12. As is usually the case, the action of the suspension spring is controlled by a shock absorber and, in the present instance, the shock absorber 13 is located within the spring 12 with the opposite ends respectively connected to the sprung and unsprung assemblies.

The shock absorber illustrated is of the tubular two-way direct acting fluid type and is preferably installed in the assembly with the axis thereof substantially coincident with the axis of the coil spring 12. As pointed out above, the present invention concerns itself more particularly with the mounting or location of the shock absorber in the assembly and the advantages of the location or mounting of the shock absorber may be obtained regardless of the specific type or construction of double acting shock absorber employed. Inasmuch as any one of the accepted direct acting shock absorbers may be used to obtain the advantages of this invention, it is not believed necessary to complicate this description with a detailed definition of the shock absorber. It will suffice to point out that the shock absorber 13 embodies a tubular casing 14 having a cap 15 at the lower end attached to the unsprung assembly 11 and having a plunger 16 operatively connected to a piston (not shown) reciprocably mounted in the casing 14. The plunger 16 projects above the top end of the casing 14 and is operatively connected to the sprung assembly 10.

In view of the fact that the shock absorber 13 extends through the coil spring 12, it necessarily follows that the opposite ends of the shock absorbers are connected to the parts of the vehicle which have been originally designed to withstand the load applied to the parts by the spring 12. It may be said, therefore, that these parts inherently possess the required strength and rigidity to carry the stresses of the shock absorber. It is not necessary, therefore, to make special provision for the shock absorber mountings and this is desirable not only from the standpoint that it offers the possibility of reducing the weight and cost of the vehicle to the minimum, but also it solves the problem of locating the shock absorber in a position where it will not interfere with other parts of the running gear and where it will operate more satisfactorily. In connection with the operation of the shock absorber, it will be noted that by locating the same in the coil spring 12, the leverage action between the spring and the shock absorber is practically eliminated and, accordingly, the stress on the shock absorber, as well as on the parts to which the shock absorber is connected, is reduced. In addition, the shock absorber installation previously described provides for obtaining substantially the maximum displacement of the shock absorber and thereby insures more satisfactory control of the spring deflection. It is also important to note that the convolutions of the coil spring 12 protect the shock absorber from injury by stones or other objects that may be thrown in the direction of the shock absorber by the ground engaging wheels.

Referring now more in detail to the particular spring suspension system illustrated in the drawing, it will be noted that the reference character 17 designates a cross brace of the vehicle chassis and, in the interests of rigidity, this cross brace is preferably a "box cross section." The bottom wall of the cross brace is formed with an opening 18 therethrough of sufficient dimension to permit the coil spring 12 to extend upwardly into the cross brace and the top wall of the latter is also fashioned with an opening 19 therethrough to permit extending the plunger 16 of the shock absorber beyond the top of the brace. The upper end of the coil spring 12 seats against a rubber ring 20 which, in turn, is held in abutting engagement with the inner side of the top wall of the brace 17 by the action of the spring 12 and the upper end of the latter is prevented from lateral shifting movement with respect to the cross brace by means of a depending flange 21 surrounding the opening 19.

The opening 19 through the top wall of the cross brace 17 is closed by means of a bell-shaped member 22 having an annular laterally outwardly extending flange 23 at the free edge thereof clamped to the top wall of the brace 17 by means of the fastener elements 24. It will be observed from Figure 1 that the base of the bell-shaped member 22 is centrally apertured to permit extending the upper end of the plunger 16 therethrough. The portion 25 of the plunger 16 extending through the aperture in the base of the bell-shaped member 22 is reduced to form an annular shoulder 26, and this shoulder forms an abutment for a rubber mounting 27.

The rubber mounting 27 comprises a pair of rubber biscuits 28 sleeved on the reduced portion 25 and cooperating with each other to form an annular recess 29 between adjacent ends thereof for receiving the marginal portions of the bell-shaped member 22 surrounding the central opening therethrough. The lower biscuit 28 of the rubber mounting is seated on a washer 30 centrally apertured to receive the reduced portion 25 of the plunger 16 and, in turn, rests on the annular shoulder 26. The upper end of the cooperating biscuit 28 is engaged by a similar washer 31 centrally apertured to receive the reduced portion 25 of the stem 16 and engaged by a clamping nut 32 threaded on the upper end of the reduced portion 25. The clamping nut 32 cooperates with the annular shoulder 26 on the plunger 16 to secure the rubber biscuits under compression against the base portion of the bell-shaped member 22 and against the reduced portion 25 of the plunger 16. As a result, a silent non-lubricant pivotal connection is provided between the plunger 16 of the shock absorber 13 and the sprung assembly 10.

In Figure 1 of the drawing, the cap 15, closing the lower end of the shock absorber casing 14, is pivotally connected to the ground engaging wheel supporting structure forming a part of the unsprung assembly 11. In the present instance, the ground engaging wheel supporting structure comprises a bottom wishbone type link 33 having arms 34 diverging toward the longitudinal center line of the vehicle and hingedly connected to the cross brace 17 in accordance with conventional practice by means of a shaft 35. Clamped to the underside of the wishbone type link 33 is a plate 36 bridging the arms 34 and secured thereto by means of the fastener elements 37. The plate 36 forms an abutment for the lower end of the spring 12 and is centrally apertured to permit the lower end of the shock absorber 13 to extend therethrough. In this connection, attention is called to the fact that the metal surrounding the opening through the plate is bent upwardly to form an annular flange 38 which extends into the lower end of the spring 12 and prevents lateral shifting movement of the spring relative to the plate 36.

Upon reference to Figures 1 and 3, it will be noted that the cap 15 at the lower end of the shock absorber 13 is pivotally connected to an arm 39 extending across the central opening through the plate 36 at the underside of the latter and having the opposite ends secured to the plate by a pair of the fastener elements 37. In detail, the cap 15 has a loop 40 secured thereto and this loop is, in turn, connected to the arm 39 by means of a stud 41. As shown in Figure 3, a rubber bushing 42 is sleeved on the stud 41 and extends into the loop 40. In the present instance, the bushing is formed of complementary sections insertable into the loop 40 from opposite ends thereof and held under compression between the loop and stud by means of a clamping nut 43 operable to secure the stud to the arm 39. The arrangement is such that the rubber bushing 42 permits limited universal movement at the lower end of the shock absorber relative to the supporting arm 39.

The outer end of the wishbone type link 33 is pivotally connected to the lower end of a link 44 having a bushing 45 thereon for supporting the wheel spindle (not shown) and having the upper end pivotally connected to the sprung assembly 10 by means of a second wishbone type link 46. The top wishbone type link 46 comprises a pair of arms 47 and 48 extending inwardly on opposite sides of the bell member 22 and having the inner ends connected to a shaft 49. The shaft 49 is journalled in bearings suitably mounted on the cross brace 17 and the arrangement is such as to permit rocking movement of the link 46 about the axis of the shaft 49. As shown in Figure 2 of the drawing, the outer end of the arm 48 is secured to the underside of the arm 47 intermediate the ends of the latter and the outer end of the arm 47 is pivotally connected to the upper end of the link 44.

The action of the previously described linkage to provide independent movement of the ground engaging wheel carried thereby is well-known in the art and need not be described herein. However, attention is called to the fact that the connection of the upper end of the shock absorber to the unsprung assembly 10 is accomplished independently of the wheel supporting linkage and, accordingly, none of the shock absorber stresses are applied to the bearings for the shaft 49.

Attention may be called to the fact at this time that the mounting plate 36 for the lower end of the shock absorber 16 is also fashioned to provide for attaching a rubber bumper 50 thereto directly below the outer end of the cross brace 17 for engagement with the cross brace upon abnormal spring deflection. A similar bumper 51 is mounted on a bracket 52 which, in turn, is secured to the outer end of the cross brace 17. The bumper 51 is located to engage the top wishbone link 46 at the point where the arm 48 is secured to the arm 47.

Referring now to the embodiment of the invention shown in Figure 4, it will be noted that the principal difference in this construction and the one previously described is in the manner in which the lower end of the shock absorber is connected to the bottom wishbone type link 33'. Upon reference to Figure 4, it will be noted that the cap 15' at the bottom of the shock absorber 13' is provided with a downwardly extending shank 53 and the mounting plate 36' has a central opening therethrough for receiving the shank 53. A rubber bushing 54 is mounted on the shank 53 and comprises a pair of rubber biscuits 55. The adjacent ends of the biscuits 55 cooperate with one another to form an annular recess 56 within which the marginal edge portion of the opening through the mounting plate 36' extend. The upper end of the top biscuit 55 seats against a washer 57 which, in turn, abuts a shoulder 58 on the shank 53 and the lower end of the bottom biscuit 55 rests upon a similar washer 59. The washer 59 is engaged by a clamping nut 60 threaded on the lower end of the stud 53 and cooperating with the shoulder 58 to secure the biscuits under compression against opposite sides of the mounting plate 36'.

It will be noted from the above that the mounting 54 simulates the connection 27 between the upper end of the plunger 16 of the shock absorber and the sprung assembly 10 and operates in the same manner to permit limited angular movement of the lower end of the shock absorber relative to its mounting.

What we claim as our invention is:

1. In a vehicle having a frame member, a wishbone type link comprising links pivotally connected at their inner ends to the frame member for vertical swinging movement and converging from the latter ends, a wheel carrying element having one end connected to the outer ends of said links, means connecting the other end of the wheel carrying element to the frame member, a coil spring having one end seated on the wishbone type link intermediate the ends of said links and having the opposite end abutting the frame member, an arm having the opposite ends respectively connected to said links intermediate the ends of the latter and having a portion extending across the lower end of the coil spring, a stud extending laterally from the intermediate portion of the arm, a tubular direct acting shock absorber extending through the coil spring and having a loop at one end receiving said stud, a resilient bushing mounted on the stud within the loop and secured under compression therebetween, and means pivotally connecting the opposite end of the shock absorber to said frame member.

2. In a vehicle having a frame member, a wishbone type link, comprising links pivotally connected at their inner ends to the frame member for vertical swinging movement and converging from the latter ends, a wheel carrying element having one end connected to the outer ends of said links and having the opposite end connected to the frame member, a plate extending between said links intermediate the ends of the latter and having an opening therethrough, fastener elements for securing said plate to the links, a coil spring having one end abutting the plate around the opening therethrough and having the opposite end abutting the frame member, an arm having the opposite ends respectively connected to said links intermediate the ends of the latter by the fastener elements aforesaid and having a portion intermediate said ends extending across the opening in said plate beneath the latter, a tubular direct acting shock absorber extending through the coil spring and opening in said plate, and means respectively pivotally connecting the opposite ends of the shock absorber to said frame member and to said intermediate portion of the arm.

3. In a vehicle having a frame member, a wishbone type link comprising links pivotally connected at their inner ends to the frame member for vertical swinging movement and converging from the latter ends, a wheel carrying element having one end connected to the outer ends of said links and having the opposite end connected to the frame member, a plate extending between said links intermediate the ends of the latter and having an opening therethrough, fastener elements for securing said plate to the links, a coil spring having one end abutting the plate around the opening therethrough and having the opposite end abutting the frame member, an arm having the opposite ends respectively connected to the links intermediate the ends thereof and having a portion intermediate said ends extending in the general direction of the links across the opening in said plate beneath the latter, a stud extending laterally from the intermediate portion of the arm, a tubular direct acting shock absorber extending through the coil spring and opening in said plate and having a loop at one end adapted to receive the stud, a resilient bushing surrounding the stud within the loop and secured under compression therebetween, means pivotally connecting the opposite end of the shock absorber to the frame member, and a bumper mounted on said plate to one side of the coil spring and engageable with the frame member to limit deflection.

4. In a vehicle having a frame member provided with an opening therethrough, a bell-shaped housing having the lower marginal edge portions secured to the top of the frame member around the opening therethrough, a wishbone type link comprising links pivotally connected at their inner ends to the bottom surface of the frame member for vertical swinging movement and converging from the latter ends, a wheel carrying element having the lower end connected to the outer ends of said links and having the upper end connected to the frame member, a coil spring having the lower end seated on the wishbone type link intermediate the ends of said links and having the upper end abutting the frame member around the opening therethrough, a tubular direct acting shock absorber extending through the coil spring and having the upper end extending into the housing through the opening in the frame member, means connecting the upper end of the shock absorber to the top wall of the housing, and means pivotally connecting the lower end of the shock absorber to the wishbone type link including an arm extending transversely of the coil spring below the lower end of the latter and having the opposite ends respectively connected to said links.

5. In a vehicle having a frame member, a wishbone type link comprising links pivotally connected at their inner ends to the frame member for vertical swinging movement and converging from the latter ends, a wheel carrying element having one end connected to the outer ends of said links and having the opposite end connected to the frame member, a plate extending between said links intermediate the ends of the latter and having an opening therethrough, fastener elements for securing said plate to the links, a coil spring having one end abutting the plate around the opening therethrough and having the opposite end abutting the frame member, an arm having the opposite ends respectively connected to said links intermediate the ends of the latter and having a portion intermediate said ends extending across the opening in said plate beneath the latter, a tubular direct acting shock absorber extending through the coil spring and opening in said plate, and means respectively pivotally connecting the opposite ends of the shock absorber to said frame member and to said intermediate portion of the arm.

WILLIAM D. McINTYRE.
JOHN M. NICKELSEN.
CHARLES E. READ.